Aug. 31, 1965    D. JENTZSCH ETAL    3,203,249
GAS CHROMATOGRAPHY VALVING APPARATUS
Filed Aug. 14, 1962    2 Sheets-Sheet 1

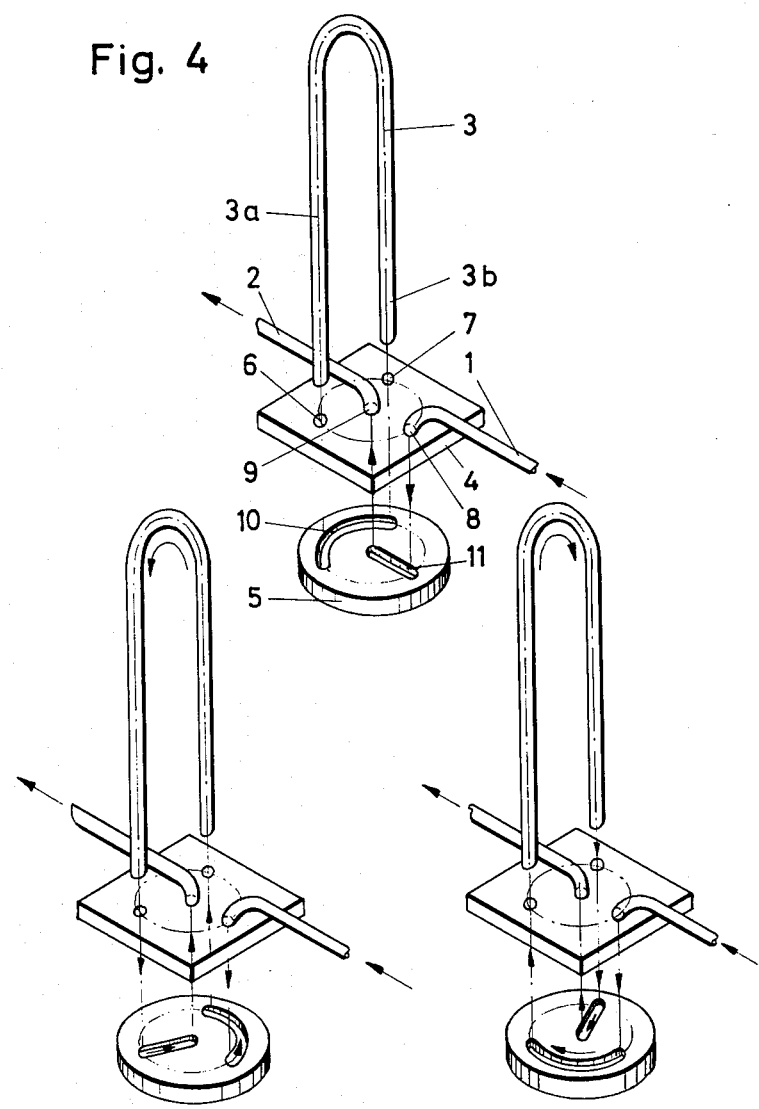

United States Patent Office
3,203,249
Patented Aug. 31, 1965

3,203,249
GAS CHROMATOGRAPHY VALVING
APPARATUS
Dietrich Jentzsch and Horst Weber, Uberlingen am
Bodensee, Germany, assignors to Bodenseewerk Perkin-
Elmer & Co. G.m.b.H., Uberlingen am Bodensee,
Germany
Filed Aug. 14, 1962, Ser. No. 216,807
Claims priority, application Germany, Aug. 18, 1961,
B 63,704
5 Claims. (Cl. 73—422)

This invention relates to gas chromatography and more particularly to an improved valving apparatus for use therein.

Gas chromatography is a well known system for separating the various components of a fluid mixture. One type of analysis is known as elution chromatography. By this technique a small volume of sample fluid is entrained in an inert carrier gas and is directed through a separating column which contains a partitioning agent. The partitioning agent has different affinities for the various sample components so that the components elute from the column at different times. The carrier from the column outlet is passed through a detector which records the various components as separate peaks or bands.

In the separation of mixtures by means of gas chromatography, it is common to connect in series several separating columns containing different separating materials. In this way, peaks that are not completely resolved in the first column may be passed to the second column for a more thorough separation. However, it is not normally desired that all the components pass into the second column as this would introduce an unnecessary time lag. For these reasons, valving is often supplied for passing some components to a second column, other components to a third column, and still other components directly to the detector. To accomplish these results, one prior art system employs a separate valve in conjunction with each separating column for short circuiting the column and removing it from the carrier gas flow. One such system is illustrated in Siemens-Periodical, issue 3, March 1959, pages 137 to 144 "Prazisions-Gas Chromatograph fur das Betriebslaboratorium" (Precision Gas Chromatograph for the Industrial Laboratory), in particular FIG. 2.

In many cases it is also desirable to reverse the direction of carrier flow through the column. When this is done, the high boiling components which normally require a long period of time to pass through the separating column may be backflushed from the entrance portion of the column and thereby removed. It is also well known in the prior art to provide a backflushing valve on each individual separating column.

It is the primary object of the present invention to provide a novel valve which combines the functions of a bypass valve and a backflush valve.

Other objects are to provide an improved chromatographic apparatus and to provide such an apparatus capable of increased flexibility at lower cost.

The objects of the invention are achieved by providing a valve having a flat stator surface containing four ports. Three of the ports are positioned at the corners of an imaginary equilateral triangle, and the fourth port is centrally located between the other three. A chromatographic separating column is connected between two of the outer ports. The remaining outer port is connected to a source of carrier gas and the central port is connected with a detector.

The movable portion of the valve comprises a disk which rotates against the stator and which contains an arcuate channel extending through an arc of 120°, bridging two outer ports. Another channel extends radially from the center of an imaginary circle containing the arcuate channel to a point on such circle directly opposite the arcuate channel.

A valve constructed in this manner has three valve positions. In a first position, the carrier gas inlet and outlet are directly connected to one another through the radial channel. In this position, therefore, the separating column is bypassed. In the other two positions, the carrier gas inlet is connected by means of the arcuate channel with either end of the separating column. At the same time, the other end of the separating column is connected by the radial channel to the carrier gas outlet. It is thus possible to optionally valve the separating column to either "forward flow," "back-flush," or "bypass" positions.

A specific embodiment of the invention is illustrated in the drawings wherein:

FIGS. 4–6 illustrate schematically the various positions of a valve constructed in accordance with the invention.

Figure 1:
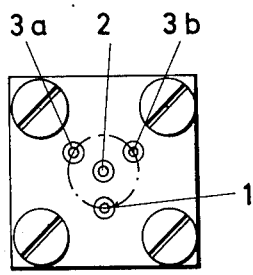
FIG. 1 is a front view of a valve constructed in accordance with the invention.

By specific reference to FIG. 4 it will be seen that a carrier gas inlet conduit 1 is connected to receive carrier gas flow as shown by the arrows. A carrier outlet conduit 2 extends from the valve to a detector which is not shown. A gas chromatographic separating column 3 is connected by its two ends, 3a and 3b, to the remaining stator ports. The valve itself comprises a flat stator plate 4 and a rotatable disk 5 in sliding contact. Stator 4 contains ports 6, 7, and 8 connected respectively to separating column ends 3a and 3b and to carrier inlet conduit 1. Ports 6, 7, and 8 are positioned at the corners of an imaginary equilateral triangle. A central port 9, which is conected to outlet conduit 2, is centrally positioned between the other three ports.

Rotor disk 5 contains two gas flow channels. Channel 10 is an arcuate channel which extends over an arc of 120° of the circle containing ports 6, 7, and 8. Channel 11 is radial and extends from the center of such circle to a point on its circumference directly opposite the center of channel 10.

In the valve position illustrated in FIG. 4 carrier gas enters from conduit 1 and passes directly through channel 11 to outlet conduit 2. Ends 3a and 3b of column 3 are connected with one another through channel 10 and are thus disconnected from the carrier circuit. FIG. 4, therefore, illustrates the "bypass" position of the valve.

In the illustration of FIG. 5, the rotor disk 5 has been rotated 120°. The carrier gas stream from conduit 1 is now caused to flow through arcuate channel 10 to end 3b of column 3. From end 3a of column 3 the carrier gas passes through channel 11 to the central port 9 and from thence to outlet conduit 2. It is to be noted that in this position carrier gas flow through the separating column is from end 3b to end 3a.

In the illustration of FIG. 6, valve disk 5 has been rotated another 120°. It will be noted that carrier gas flow passes from port 8 through channel 10 and into end 3a of column 3. From column end 3b the carrier gas flows through channel 11 and passes out of the valve via outlet conduit 2. In this position, carrier gas flows through column 3 from end 3a to end 3b. Accordingly, if the position illustrated in FIG. 5, is the position for "normal" flow through the separating column, the diagram of FIG. 6 illustrates the "backflush" position.

Figure 2:
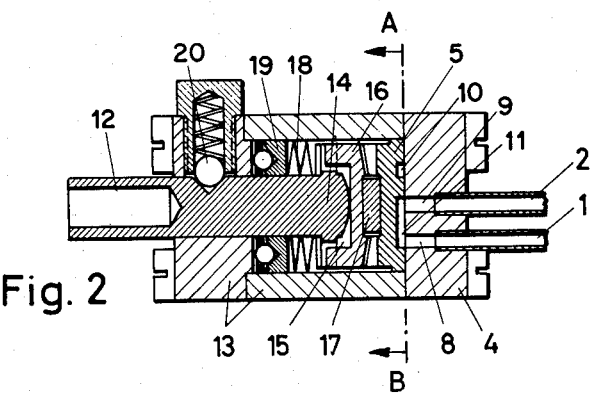
FIG. 2 is a cross-sectional elevation of the valve of FIG. 1.
Figure 3:
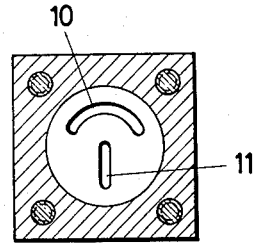
FIG. 3 is a cross-section taken along line A–B of FIG. 2.

FIGS. 1–3 illustrate in detail the mechanical construction of the valve of this invention. Rotor disk 5 (FIG. 2) is rotated by a control shaft 12 which is centrally supported in valve housing 13. The end 14 is flattened to form a tongue which is curved in the plane of the paper as illustrated. This flat tongue engages a groove 15 of a first drive member 16. This tongue and groove connection allows direct rotational drive from shaft 12 to member 16 but simultaneously allows member 16 to tilt relative to control shaft 12 about an axis perpendicular to the plane of the paper. A similar tongue and groove connection is provided between member 16 and rotor disk 5. However, the tongue 17 of member 16 is positioned perpendicular to that of end 14 so as to allow tilting about an axis lying in the plane of the paper. In this manner, a flexible coupling is provided which permits the rotor disk 5 to maintain alignment against stator 4. A compression spring 18 surrounds control shaft 12 and exerts a compressive force against the end of shaft 12 and bearing 19. The force exerted against bearing 19 is transmitted directly against valve housing 13. A spring loaded ball locking mechanism 20 is provided for indexing shaft 12 in any of its three positions.

It is important that the abutting surfaces of the valve operate without lubrication so as to avoid the many difficulties which lubricants may create in chromatographic systems. Valves constructed of polytetrafluorethylene ("Teflon") are satisfactory for this purpose.

A further advantage of the valve of the invention is that rotor disk 5 may be easily interchanged in accordance with the temperature or other conditions to be encountered. Thus, Teflon, other plastics, or pure metals such as gold or sintered metals can be used with the valve of this invention. With the latter metals, the valve of this invention is usable to temperatures of 400° C. The temperature limit of existing present day valves is approximately 80° C.

It will be readily apparent to those skilled in the art that many variations and modifications of this invention may be made without departing from the spirit and scope thereof. Accordingly, the foregoing specification is to be considered illustrative only and not limiting. The invention is limited only by the scope of the following claims.

We claim:
1. A valve adapted for use in chromatography which comprises: a stator member having a first planar surface and defining in said surface first, second, and third ports, each of said ports being positioned at a corner of an equilateral triangle, and a fourth port being positioned equidistant from said first, second, and third ports; a rotor member having a second planar surface contacting said first surface and defining in said second surface a first channel adapted to interconnect two of said first, second, and third ports to allow fluid flow therebetween and a second channel adapted to interconnect the remaining ports to allow fluid flow therebetween; carrier gas supply conduit means connected to said first port; carrier gas outlet conduit means connected to said fourth port; means for connecting a chromatographic separating column between said second and third ports; and actuating means for rotating said rotor member relative to said stator member, about said fourth port.

2. The apparatus of claim 1 wherein said actuating means is a shaft.

3. The apparatus of claim 2 wherein said shaft includes a flexible coupling.

4. The apparatus of claim 1 wherein said rotor member is retained in compressive sliding contact against said stator.

5. A gas chromatographic valving system for selectively allowing normal forward gas flow through, reverse backflushing gas flow through, and bypassing of at least one separating column comprising: a stator valve member having a first surface defining four ports; carrier gas supply conduit means connected to a first of said four ports; means for connecting the two ends of a chromatographic separating column to a second and a third of said ports, respectively; carrier gas outlet conduit means connected to said fourth port; a rotor valve member having a second surface contacting and mating with said stator surface; means defining in said rotor second surface a first channel so formed as to be positionable to selectively interconnect any two of said first, second and third ports to allow fluid flow therebetween; means in said second surface defining a second channel so formed as to be positionable to selectively connect the fourth port to the remaining one of said first three ports; and actuating means for rotating said rotor member relative to said stator member so as to select any one of the three positions, corresponding to the normal, backflushing, and by passing operations.

References Cited by the Examiner

UNITED STATES PATENTS

| | | | |
|---|---|---|---|
| 804,909 | 11/05 | Young | 137—625.21 |
| 1,014,241 | 1/12 | Mailloux et al. | 251—180 |
| 2,696,219 | 12/54 | Barksdale | 251—304 |
| 2,841,005 | 7/58 | Coggeshall | 73—23 |
| 2,972,888 | 2/61 | Lamkin | 73—23 |

RICHARD C. QUEISSER, *Primary Examiner.*

JOSEPH P. STRIZAK, *Examiner.*